(12) United States Patent
Nguyen Phan et al.

(10) Patent No.: US 12,371,802 B2
(45) Date of Patent: Jul. 29, 2025

(54) HOLLOW-SPHERE TIN NANOCATALYSTS FOR CONVERTING $CO_2$ INTO FORMATE

(71) Applicant: Battelle Memorial Institute, Columbus, OH (US)

(72) Inventors: Thuy Duong Nguyen Phan, Pittsburgh, PA (US); Douglas R. Kauffman, Pittsburgh, PA (US)

(73) Assignee: Battelle Memorial Institute, Columbus, OH (US)

( * ) Notice: Subject to any disclaimer, the term of this patent is extended or adjusted under 35 U.S.C. 154(b) by 616 days.

(21) Appl. No.: 17/668,061

(22) Filed: Feb. 9, 2022

(65) Prior Publication Data
US 2022/0267913 A1 Aug. 25, 2022

Related U.S. Application Data

(60) Provisional application No. 63/147,481, filed on Feb. 9, 2021.

(51) Int. Cl.
*B01J 23/14* (2006.01)
*C01G 19/02* (2006.01)
(Continued)

(52) U.S. Cl.
CPC .............. *C25B 3/07* (2021.01); *B01J 23/14* (2013.01); *C01G 19/02* (2013.01); *C25B 9/17* (2021.01);
(Continued)

(58) Field of Classification Search
CPC .......... B01J 23/14; C25B 3/07; C25B 11/042; C25B 11/052; C25B 9/17; G01G 19/02
See application file for complete search history.

(56) References Cited

U.S. PATENT DOCUMENTS 3,951,867 A * 4/1976 Howell .................. B01J 23/626
423/213.2
4,971,940 A * 11/1990 Kaminsky ................ C07C 2/84
502/340

(Continued)

OTHER PUBLICATIONS

Acarbas et al. "Preparation of nanosized tin oxide (SnO2) powder by homogeneous precipitation". Ceramics International 33 (2007) 537-542. (Year: 2007).*

(Continued)

*Primary Examiner* — Cam N. Nguyen
(74) *Attorney, Agent, or Firm* — Susanne A. Wilson; Frank Rosenberg

(57) ABSTRACT

Three-dimensional (3D) hollow nanosphere electrocatalysts that convert $CO_2$ into formate with high current density and Faradaic efficiency (FE). The $SnO_2$ nanospheres were constructed from small, interconnected $SnO_2$ nanocrystals. The size of the constituent $SnO_2$ nanocrystals was controlled between 2-10 nm by varying the calcination temperature and observed a clear correlation between nanocrystal size and formate production. In situ Raman and time-dependent X-ray diffraction measurements confirmed that $SnO_2$ nanocrystals were reduced to metallic Sn and resisted microparticle agglomeration during $CO_2$ reduction. The nanosphere catalysts outperformed comparably sized, non-structured $SnO_2$ nanoparticles and commercially-available $SnO_2$ with a heterogeneous size distribution.

11 Claims, 11 Drawing Sheets

(51) Int. Cl.
C25B 3/07 (2021.01)
C25B 9/17 (2021.01)
C25B 11/042 (2021.01)
C25B 11/052 (2021.01)
G01G 19/02 (2006.01)

(52) U.S. Cl.
CPC .......... *C25B 11/042* (2021.01); *C25B 11/052* (2021.01); *C01P 2004/34* (2013.01); *C01P 2004/64* (2013.01); *C01P 2006/40* (2013.01)

(56) References Cited

U.S. PATENT DOCUMENTS

| | | | | |
|---|---|---|---|---|
| 6,511,614 | B1* | 1/2003 | Yukinobu | C01G 19/00 252/521.1 |
| 6,696,386 | B2* | 2/2004 | Inoue | B01D 53/944 502/223 |
| 6,756,337 | B2* | 6/2004 | Nakanishi | B01J 29/068 502/64 |
| 11,108,070 | B2 | 8/2021 | Uchida et al. | |
| 2002/0169525 | A1* | 11/2002 | Cronin | G05B 13/027 701/6 |
| 2009/0047206 | A1* | 2/2009 | Okazaki | B82Y 40/00 423/445 B |

OTHER PUBLICATIONS

Nehru et al. "Photoluminescence Studies on Nanocrystalline Tin Oxide Powder for Optoelectronic Devices". American Journal of Materials Science 2012, 2(12): 6-10. (Year: 2012).*

Han et al. "Simple Synthesis of Hollow Tin Dioxide Microspheres and Their Preparation to Lithium-Ion Battery Anodes". Advanced Functional Materials 2005, 15, 1845-1850. (Year: 2005).*

Shi et al. "Facile Fabrication and Optical Property of Hollow SnO2 Spheres and Their Application in Water Treatment". Lamgmuir 2010, 26 (24), 18718-18722. (Year: 2010).*

Patil et al. "Synthesis of SnO2 hollow microspheres from ultrasonic atomization and their role in hydrogen sensing". Material Science and Engineering B, 176 (2011) 579-587. (Year: 2011).*

Kong et al. "Three-dimensional hollow spheres of porous SnO2/rGO composite as high performance anode for sodium ion batteries". Applied Surface Science 479 (2019) 198-208. (Year: 2019).*

Gyer et al. "Nanoscale SnO2 Hollow Spheres and Their Application as a Gas-Sensing Material". Chemistry of Materials, 2010, 22, 4821-4827. (Year: 2010).*

Qiao, J.; Liu, Y.; Hong, F.; Zhang, J. "A Review of Catalysts for the Electroreduction of Carbon Dioxide to Produce Low-Carbon Fuels". Chem. Soc. Rev. 2014, 43, 631-675.

Lu, Q.; Rosen, J.; Jiao, F. "Nanostructured Metallic Electrocatalysts for Carbon Dioxide Reduction". ChemCatChem 2014, 7, 38-47.

Vasileff, A.; Zheng, Y.; Qiao, S. Z. "Carbon Solving Carbon's Problems: Recent Progress of Nanostructured Carbon-Based Catalysts for the Electrochemical Reduction of CO2". Adv. Energy Mater. 2017, 7, 1700-1759.

Wang, Y.; Han, P.; Lv, X.; Zhang, L.; Zheng, G. "Defect and Interface Engineering for Aqueous Electrocatalytic CO2 Reduction". Joule 2018, 2, 2551-2582.

Zhao, S.; Li, S.; Guo, T.; Zhang, S.; Wang, J.; Wu, Y.; Chen, Y. Advances in Sn-Based Catalysts for Electrochemical CO2 Reduction. Nano-Micro Lett. 2019, 11, 62.

Han, N.; Ding, P.; He, L.; Li, Y.; Li, Y. "Promises of Main Group Metal-Based Nanostructured Materials for CO2 Reduction to Formate". Adv. Energy Mater. 2019, 10 1902338.

Xie, J.-F.; Huang, Y.-X.; Li, W.-W.; Song, X.-N.; Xiong, L.; Yu, H.-Q. "Efficient Electrochemical CO2 Reduction on a Unique Chrysanthemum-like Cu Nanoflower Electrode and Direct Observation of Carbon Deposite". Electrochim. Acta 2014, 139 137-144.

Won, D. H.; Choi, C. H.; Chung, J.; Chung, M. W.; Kim, E.-H.; Woo, S. I. "Rational Design of a Hierarchical Tin Dendrite Electrode for Efficient Electrochemical Reduction of CO2". ChemSusChem 2015, 8, 3092-3098.

Li, Y. N.; Qiao, J. L.; Zhang, X.; Lei, T.; Girma, A.; Liu, Y. Y.; Zhang, J. J. "Rational Design and Synthesis of SnOX Electrocatalysts with Coralline Structure for Highly Improved Aqueous CO2 Reduction to Formate". ChemElectroChem 2016, 3, 1618-1628.

Fu, Y.; Li, Y.; Zhang, X.; Liu, Y.; Qiao, J.; Zhang, J.; Wilkinson, D. P. "Novel Hierarchical SnO2 Microsphere Catalyst Coated on Gas Diffusion Electrode for Enhancing Energy Efficiency of CO2 Reduction to Formate Fuel". Appl. Energy 2016, 175, 536-544.

Du, D.; Lan, R.; Humphreys, J.; Sengodan, S.; Xie, K.; Wang, H.; Tao, S. "Achieving Both High Selectivity and Current Density for CO2 Reduction to Formate on Nanoporous Tin Foam Electrocatalysts". ChemistrySelect 2016, 1, 1711-1715.

Kumar, B.; Atla, V.; Brian, J. P.; Kumari, S.; Nguyen, T. Q.; Sunkara, M.; Spurgeon, J. M. Reduced SnO2 Porous Nanowires with a High Density of Grain Boundaries as Catalysts for Efficient Electrochemical CO2-into-HCOOH Conversion. Angew. Chem., Int. Ed. 2017, 56, 3644-3649.

Liang, C.; Kim, B.; Yang, S.; Liu, Y.; Woellner, C.F.; Li, Z.; Vajtai, R.; Yang, W.; Wu, J.; Kenis, P. J. A.; Ajayan, P. M. "High Efficiency Electrochemical Reduction of CO2 beyond the Two-Electron Transfer Pathway on Grain Boundary Rich Ultra-Small SnO2 Nanoparticles". J. Mater. Chem. A 2018, 6, 10313-10319.

Koh, J. H.; Won, D. H.; Eom, T.; Kim, N.-K.; Jung, K. D.; Kim, H.; Hwang, Y. J.; Min, B. K. "Facile CO2 Electro-Reduction to Formate via Oxygen Bidentate Intermediate Stabilized by High-Index Planes of Bi Dendrite Catalyst". ACS Catal. 2017, 7, 5071-5077.

Nguyen-Phan, T.-D., et al. "Understanding Three-Dimensionally Interconnected Porous Oxide-Derived Copper Electrocatalyst for Selective Carbon Dioxide Reduction". J. Mater. Chem. A 2019, 7, 27576-27584.

Fu, Yishu et al., "Electrochemical CO2 reduction to formic acid on crystalline SnO2 nanosphere catalyst with high selectivity and stability", Chinese J. Catal. 2016, 37, 1081-1088.

Xia, Z.; Freeman, M.; Zhang, D.; Yang, B.; Lei, L.; Li, Z.; Hou, Y. "Highly Selective Electrochemical Conversion of CO2 to HCOOH on Dendritic Indium Foams". ChemElectroChem 2017, 5, 253-259.

Bejtka, K.; Zeng, J.; Sacco, A.; Castellino, M.; Hernandez, S.; Farkhondehfal, M. A.; Savino, U.; Ansaloni, S.; Pirri, C. F.; Chiodoni, A. "Chainlike Mesoporous SnO2 as a Well-Performing Catalyst for Electrochemical CO2 Reduction". ACS Appl. Energy Mater. 2019, 2, 3081-3091.

Luo, W.; Xie, W.; Li, M.; Zhang, J.; Ziittel, A. "3D Hierarchical Porous Indium Catalyst for Highly Efficient Electroreduction of CO2". J. Mater. Chem. A 2019, 7, 4505-4515.

Luo, W.; Zhang, J.; Li, M.; Ztlttel, A. "Boosting CO Production in Electrocatalytic CO2 Reduction on Highly Porous Zn Catalysts". ACS Catal. 2019, 9, 3783-3791.

Chen, X.; Liu, Y.; Wu, J. "Sustainable Production of Formic Acid from Biomass and Carbon Dioxide". Mol. Catal. 2019, 483, 110716.

Su, F., et al. "Synthesis of Graphitic Ordered Macroporous Carbon with a Three-Dimensional Interconnected Pore Structure for Electrochemical Applications". The Journal of Physical Chemistry B, 109(43), (2005) 20200-20206.

Hellstén, P. P.; Salminen, J. M.; Jorgensen, K. S.; Nysten, T. H. "Use of Potassium Formate in Road Winter Deicing Can Reduce Groundwater Deterioration". Environ. Sci. Technl/. 2005, 39, 5095-5100.

Lissner, H.; Wehrer, M.; Jartun, M.; Totsche, K. U. "Degradation of Deicing Chemicals Affects the Natural Redox System in Airfield Soils". Environ. Sci. Pollut. Res. 2013, 21, 9036-9053.

Vo, T.; Purohit, K.; Nguyen, C.; Biggs, B.; Mayoral, S.; Haan, J. L. "Formate: An Energy Storage and Transport Bridge between Carbon Dioxide and a Formate Fuel Cell in a Single Device". ChemSusChem 2015, 8, 3853-3858.

Ha, S.; Larsen, R.; Zhu, Y.; Masel, R. I. "Direct Formic Acid Fuel Cells with 600 mA cm-2 at 0.4 V and 22" C. Fuel Cells 2004, 4, 337-343.

Enthaler, S.; von Langermann, J.; Schmidt, T. "Carbon Dioxide and Formic Acid—The Couple for Environmental-Friendly Hydrogen Storage?" Energy Environ. Sci. 2010, 3, 1207-1217.

(56) References Cited

OTHER PUBLICATIONS

Eppinger, J.; Huang, K.-W. "Formic Acid as a Hydrogen Energy Carrier". ACS Energy Lett. 2016, 2, 188-195.
Valentini, F.; Kozell, V.; Petrucci, C.; Marrocchi, A.; Gu, Y.; Gelman, D.; Vaccaro, L. "Formic Acid, a Biomass-Derived Source of Energy and Hydrogen for Biomass Upgrading". Energy Environ. Sci. 2019, 12, 2646-2664.
Ferrer, J. S. J.; Laborie, S.; Durand, G.; Rakib, M. "Formic Acid Regeneration by Electromembrane Processes". J. Membrane Sci. 2006, 280, 509-516.
Zhang, S.; Kang, P.; Meyer, T. J. "Nanostructured Tin Catalysts for Selective Electrochemical Reduction of Carbon Dioxide to Formate". J. Am. Chem. Soc. 2014, 136, 1734-1737.
Chen, Y.; Kanan, M. W. "Tin Oxide Dependence of the CO2 Reduction Efficiency on Tin Electrodes and Enhanced Activity for Tin/Tin Oxide Thin-Film Catalysts". J. Am. Chem. Soc. 2012, 134, 1986-1989.
Lv, W.; Zhang, H.; Gao, P.; Lei, L. "Studies on the Faradaic Efficiency for Electrochemical Reduction of Carbon Dioxide to Formate on Tin Electrode". J. Power Sources 2014, 252, 276-281.
Zhao, C.; Wang, J.; Goodenough, J. B. "Comparison of Electrocatalytic Reduction of CO2 to HCOOH with Different Tin Oxides on Carbon Nanotubes". Electrochem. Commun. 2016, 65, 9-13.
Fan, L.; Xia, Z.; Xu, M.; Lu, Y.; Li, Z. "1D SnO2 with Wire-in-Tube Architectures for Highly Selective Electrochemical reduction of CO2 to C1 products". Adv. Funct. Mater. 2018, 28, 1706289.
Yadav, V. S. K.; Noh, Y.; Han, H.; Kim, W. B. "Synthesis of Sn Catalysts by Solar Electro-Deposition Method for Electrochemical CO2 Reduction Reaction to HCOOH". Catal. Today 2018, 303, 276-281.
Daiyan, R.; Lovell, E. C.; Bedford, N. M.; Saputera, W. H.; Wu, K.-H.; Lim, S.; Horlyck, J.; Ng, Y. H.; Lu, X.; Amal, R. "Modulating Activity through Defect Engineering of Tin Oxides for Electrochemical CO2 Reduction". Adv. Sci. 2019, 6, 1900678.
Liu, S.; Xiao, J.; Lu, X. F.; Wang, J.; Wang, X.; Lou, X. W. (D.). "Efficient Electrochemical Reduction of CO2 to HCOOH over Sub-2 nm SHO2 Quantum Wires with Exposed Grain Boundaries". Angew. Chem. Int. Ed. 2019, 58, 8499-8503.
Feng, X.; Jiang, K.; Fan, S.; Kanan, M. W. "Grain-Boundary-Dependent CO2 Electroreduction Activity". J. Am. Chem. Soc. 2015, 137, 4606-4609.
Kim, K.-S.; Kim, W. J.; Lim, H.-K.; Lee, E. K.; Kim, H. "Tuned Chemical Bonding Ability of Au at Grain Boundaries for Enhanced Electrochemical CO2 Reduction". ACS Catal. 2016, 6, 4443-4448.
Feng, X.; Jiang, K.; Fan, S.; Kanan, M. W. "A Direct Grain-Boundary-Activity Correlation for CO Electroreduction on Cu Nanoparticles". ACS Cent. Sci. 2016, 2, 169-174.
Li, L.; Zhao, Z.-J.; Hu, C.; Yang, P.; Yuan, X.; Wang, Y.; Zhang, L.; Moskaleva, L.; Gong, J. "Tuning Oxygen Vacancies of Oxides to Promote Electrocatalytic Reduction of Carbon Dioxide". ACS Energy Lett. 2020, 5, 552-558.
Pavithra, K.; Kumar, S. M. S. "Embedding Oxygen Vacancies at SnO2-CNT Surfaces via a Microwave Polyol Strategy Towards Effective Electrocatalytic Reduction of Carbon-Dioxide to Formate". Catal. Sci. Technol. 2020, 10, 1311-1322.
Xiang, H.; Miller, H. A.; Bellini, M.; Christensen, H.; Scott, K.; Rasul, S.; Yu, E. H. "Production of Formate by CO2 Electrochemical Reduction and its Application in Energy Storage". Sustain. Energy Fuels 2020, 4, 277-284.
Dutta, A.; Kuzume, A.; Kaliginedi, V.; Rahaman, M.; Sinev, I.; Ahmadi, M.; Cuenya, B. R.; Vesztergom, S.; Broekmann, P. "Probing the Chemical State of Tin Oxide NP Catalysts during CO2 Electroreduction: A Complementary Operando Approach". Nano Energy 2018, 53, 828-840.
International Search Report from International Application No. PCT/US2022/015824, date of mailing Sep. 23, 2022.
Written Opinion of the International Search Authority from International Application No. PCT/US2022/015824, date of mailing Sep. 23, 2022.

* cited by examiner

HOLLOW-SPHERE TIN NANOCATALYSTS FOR CONVERTING $CO_2$ INTO FORMATE

RELATED APPLICATIONS

This application claims priority to U.S. Provisional Patent Application Ser. No. 63/147,481 filed 9 Feb. 2021.

Government Rights Clause: This invention was made with Government support under contract 89243318CFE000003 awarded by the U.S. Department of Energy. The Government has certain rights in this invention.

INTRODUCTION

Rationally controlling electrocatalyst structure from the atomic to micron scales is important for designing new materials that can electrochemically convert $CO_2$ into value-added chemicals and fuels.[1-6] The $CO_2$ reduction reaction ($CO_2RR$) has a rich structure-sensitivity, and substantial efforts have been devoted to improving performance by controlling the catalyst size, morphology, composition, crystallographic orientation, and surface structure.[1-6] Recent work has introduced three-dimensionality into $CO_2RR$ electrocatalyst design by assembling superstructures from nanoscale building blocks, including architectures such as micro/nano-spheres, flowers and dendrites, porous foams, inverse opals, and others.[7-20] These 3D structures offer high surface area, large density of active sites, and better accessibility for reactants and intermediates that can accelerate $CO_2RR$ kinetics and improve product selectivity and catalyst stability.[7-12,14-16,19]

Formic acid (HCOOH), electrochemically produced as formate ($HCOO^-$), is a $CO_2RR$ product with wide agricultural, industrial, chemical and pharmaceutical uses.[21-24] Formic acid/formate has also been identified as an emerging fuel for fuel cells,[25,26] a liquid hydrogen carrier with high volumetric capacity (53 g of $H_2$ per liter),[27,28] and for biomass upgrading applications.[29] Industrial formic acid production from fossil fuel precursors is extremely carbon intensive,[22] but electrochemically converting $CO_2$ to formate, followed by down-stream electrodialysis purification into formic acid,[30] could provide a carbon neutral or carbon negative route for producing this versatile chemical.

Sn-based materials are some of the most effective $CO_2RR$ electrocatalysts for formic acid/formate production.[5,6,8-13,16,18] However, the performance of most Sn-based catalysts is still inadequate for practical applications because of low current densities (typically 10~25 mA $cm_{geo}^{-2}$ in aqueous H-cells; Table 1), high overpotentials, and poor long-term stability.[5,6,8-13,16,18,31-38] Therefore, further catalyst design efforts is required to boost $CO_2RR$ activity, improve efficiency, and validate operation at high current density in realistic device architectures.

Two examples of tin oxide spheres for electrochemical $CO_2$ reduction to formic or formate have been reported in the literature by a research group from China. The article "Novel hierarchical $SnO_2$ microsphere catalyst coated on gas diffusion electrode for enhancing energy efficiency of $CO_2$ reduction to formate fuel;" Applied Energy, 2016, 175, 536-544. This article reported the synthesis of 1-3 µm large, dense $SnO_2$ microspheres composed of 20-40 nm nanoparticles by hydrothermal self-assembled process at 180° C. for 24 h using $SnCl_4$ and D-glucose monohydrate precursors. The size and morphology of hierarchical $SnO_2$ microspheres were controlled by varying the volume ratio of ethanol to distilled water. These $SnO_2$ microspheres exhibited a maximum 62% formate Faradaic efficiency (FE) at −1.7 V vs. SHE (Standard Hydrogen Electrode). Similarly, "Electrochemical $CO_2$ reduction to formic acid on crystalline $SnO_2$ nanosphere catalyst with high selectivity and stability" Chinese J. Catal., 2016, 37, 1081-1088 reported a mixture of $SnO_2$ nanoparticles and 500 nm~1 µm nanosphere aggregates composed of 20-25 nm nanoparticles that produced a maximum of 56% formate FE in 0.5 M $KHCO_3$ and max 428 mg/L formate production rate in 0.7 M $KHCO_3$ at −0.56 V vs. SHE. As described below, we have produced superior catalysts and systems.

SUMMARY OF INVENTION

Our catalyst directly converts $CO_2$ and water into formate in an electrochemical reactor, eliminating the need for the carbon intensive methanol precursor. The catalysts can have activity at least about six times higher than commercially-available $SnO_2$ catalysts, and higher than the best materials reported in the open scientific literature. The improvement in catalytic rates, efficiencies, and selectivity address core technical issues that have prevented the development of effective electrocatalytic technologies for $CO_2$ utilization.

This invention provides the synthesis and application of a new nanostructured tin-oxide ($SnO_2$) nano catalysts that efficiently converts $CO_2$ into formate with very high activity. Our synthetic procedure produces a catalyst structure composed of a hollow-sphere constructed from interconnected $SnO_2$ nanoparticles (nps). The synthetic preparation allows us to tune the size of the constituent nanoparticles and control overall activity.

$SnO_2$ nanosphere electrocatalysts can be constructed from small, interconnected $SnO_2$ nanocrystals. Tuning thermal annealing temperatures increased formate production by controlling the crystallinity and particle size of the constituent $SnO_2$ nanocrystals. $SnO_2$ nanospheres demonstrated high Faradaic efficiencies, selectivities, and superior current densities toward formate production over a wide potential range during H-cell testing. $SnO_2$ nanospheres surpassed non-templated $SnO_2$ nps of similar size and commercially-available $SnO_2$ catalysts, and exhibited good durability over 36 hours with intermittent cycles of operation. The improved $CO_2$-to-formate performance of $SnO_2$ nanospheres can be attributed to 3D structure with large electrochemical surface area and better resistance to particle sintering during $CO_2RR$.

In one aspect, the invention provides a $SnO_2$ powder, comprising at least 90 mass % hollow spheres in the (diameter) size range of 175 to 225 nm; and wherein the hollow spheres are comprised of $SnO_2$. In some preferred embodiments, at least 90 mass % hollow spheres in the (diameter) are in the size range of 180 to 220 nm, in some embodiments 190 to 210 nm.

In another aspect, the invention provides a $SnO_2$ powder, comprising hollow spheres having a diameter of 100 nm or greater, wherein the spheres are comprised of $SnO_2$ particles, and wherein at least 90 mass % of the spheres have diameters in a 10 nm range (for example from 200 to 220 nm), or in a 7 nm range or a 5 nm range or a 3 nm range.

Any of the inventive aspects may further be characterized by one or any combination of the following characteristics: the hollow spheres may have a wall thickness in the range of 20 to 35 nm or 25 to 30 nm; the hollow spheres may be comprised of nanocrystals having a mass average diameter in the range of 5 to 15 nm, or 5-10 nm, or 6 to 9 nm; an average crystallite size, as measured by XRD, in the range of 5 to 10 nm, or 6 to 9 nm, or 6 to 8 nm; the $SnO_2$ powder characterizable by a durability of maintaining a $j_{formate}$ (mA $cm_{geo}^{-2}$) of at least 35 or at least 40 or in the range of 40 to 55 at 1.2 V vs. RHE (any of the electrochemical properties can be present over a period of 1 or 2 or 3 or 4 days without regeneration, as measured according to the Electrochemical $CO_2$ Reduction Measurement that is described in the Examples section); the $SnO_2$ powder characterizable by a $j_{total}$ (mA cm$^{-2}_{geo}$) of at least 50 or at least 55 or in the range of 50 to 75 at 1.2 V vs. RHE; the $SnO_2$ powder characterizable as having a double-layer capacitance (mF cm$^{-2}$) of at least 10 or 10 to 20 or 12 to 15; the $SnO_2$ particles or an electrode comprising the $SnO_2$ particles characterized by an ESCA of at least 35 or at least 40 or at least 45, or in the range of 35 to 60 or 40 to 55 or 45 to 52 cm$^{-2}$; and/or wherein the particles, electrodes, or methods are characterizable by properties within ±10% or ±20% or ±30% of the data shown in the Examples. The invention also includes methods of converting $CO_2$ to formate or formic acid comprising contacting an $SnO_2$-coated electrode with $CO_2$ and $H_2O$ and passing an electrical current through the electrode; wherein the $CO_2$ and $H_2O$ react over the catalyst to form formate; and wherein the $SnO_2$ comprises any of the compositions described herein.

In another aspect, the invention comprises a method of making a $SnO_2$ catalyst, comprising: providing a suspension of polymer particles, combining a tin salt with the suspension, removing the liquid from the suspension (preferably by evaporation) to form tin-coated polymer particles, drying the tin-coated polymer particles, and calcining the dried particles to burn out the polymer particles leaving hollow $SnO_2$ spheres. In some preferred embodiments, the method can be further characterized by one or any combination of the following optional features: the suspension is an aqueous suspension; the polymer particles comprising poly (methyl methacrylate) spheres, polystyrene spheres, carboxylic polystyrene spheres, poly(n-butyl acrylate-acrylic acid) spheres, carbon spheres, silica spheres, or other suitable spherical particles; calcining is preferably carried out at a temperature in the range of 300 to 600° C., or 400 to 575° C., or 450 to 550° C.

In a further aspect, the invention provides a catalyst ink comprising $SnO_2$ particles dispersed in a liquid phase along with conductive particles and binder particles. Preferred compositions of ink comprise at least 50% or at least 70% or at least 80% $SnO_2$ particles. Preferred conductive particles comprise carbon black, carbon fibers, carbon or graphene sheets, or carbon nanotubes; preferably the ink comprises at least 2% or at least 5%, or in the range of 2% to 20%, or 3% to 15% conductive particles. Preferred binders are polymeric binders, preferably a sulfonated tetrafluoroethylene based fluoropolymer-copolymer such as Nafion®. Preferably the ink comprises at least 5% or at least 10%, or in the range of 5% to 40% binder. The liquid phase preferably is primarily an alcohol or mixture of alcohols such as methanol, ethanol, isopropanol or n-propanol.

In another aspect, the invention provides an electrode, comprising a conductive substrate coated with the $SnO_2$ powder. Preferably, the conductive substrate comprises carbon, preferably a porous carbon paper. The invention also includes methods of making an electrode by impregnating, drop-casting or coating an ink into or on a conductive substate. The invention also includes a system comprising an electrode comprising a tin catalyst disposed in a solution that is saturated with $CO_2$, and further wherein the system or catalyst is characterizable by a durability of maintaining a $j_{formate}$ (mA cm$_{geo}^{-2}$) of at least 35 or at least 40 or in the range of 40 to 55 at 1.2 V vs. RHE for at least one or at least two or at least three days or from one to five days. The invention also includes systems comprising the electrode disposed in a solution (preferably an aqueous solution) that is saturated with $CO_2$. Preferably, a circuit is formed with an anode wherein the anode and $SnO_2$-coated electrode are present in an electrochemical cell separated by a proton exchange membrane.

In a further aspect, the invention provides a method of converting $CO_2$ to formate or formic acid comprising contacting an $SnO_2$-coated electrode with $CO_2$ and $H_2O$ and passing an electrical current through the electrode; wherein the $CO_2$ and $H_2O$ react over the catalyst to form formate. The electrode has a Faradaic efficiency to formate of at least 50%, or at least 60%, or at least 70% or in the range of 60 to 85%; preferably conducted at a potential in the range of 0.7 to 1.4 V vs. RHE, or 0.9 to 1.3 V vs. RHE. During the reaction, the $SnO_2$ may be converted to partly reduced (less than two oxygens per Sn) or metallic Sn. The method/system preferably can be conducted for at least 24 hours without replacing or regenerating the electrode while maintaining Faradaic efficiency at the claimed level. The method/system may be conducted with a HCOO$^-$ current density of at least 40, or at least 45, or in the range of 40 to 60 or 45 to 55 mA cm$^2_{geo}$. Preferably, the $SnO_2$ particles have one or more of the characteristics of the $SnO_2$ spheres described herein.

Advantageous features of the invention include formate production rates at least two times or at least four times or at least six-fold higher than commercially-available $SnO_2$ powders or $SnO_2$ powders prepared by the same procedure as the templated particles but without the spherical polymeric templates; the ability to provide catalysis without precious metals; for example, less or equal to 1 mass % or 0.5 mass % of all precious metals such as Au, Ag, Pt, Pd; unique synthetic technique produce hollow sphere-like catalysts composed of small nanostructured particles that boost performance.

Throughout these descriptions, % refers to mass % unless indicated otherwise. The electrochemical characteristics of the powders, electrodes and/or systems are measured as set forth in the Examples, specifically the Electrochemical $CO_2$ Reduction Measurement. Note that the term "characterizable by" means that the composition or system can be measured to possess the property, like any other characteristic, the property can be latent until measured. Various aspects of the invention are described using the term "comprising;" however, in narrower embodiments, the invention may alternatively be described using the terms "consisting essentially of" or, more narrowly, "consisting of.

DETAILED DESCRIPTION OF THE INVENTION

Catalysts were synthesized using a tin-salt precursor dissolved in alcohol and citric acid. A polymer template was mixed with the starting catalyst precursor, dried in air and calcined at high temperatures to form the catalyst structures. We could control the resulting catalyst structure based on the synthetic conditions and calcination temperature. A preferred catalyst prepared at 500° C. comprises approximately 205-210 nm diameter and 25-30 nm wall thickness hollow spheres constructed from interconnected, about 10 nm $SnO_2$ nanoparticles. X-ray photoelectron spectroscopy confirmed the composition and oxidation state of the metal, and X-ray diffraction confirmed the nanocrystallite $SnO_2$ size of ~7.5 nm.

Figure 1:
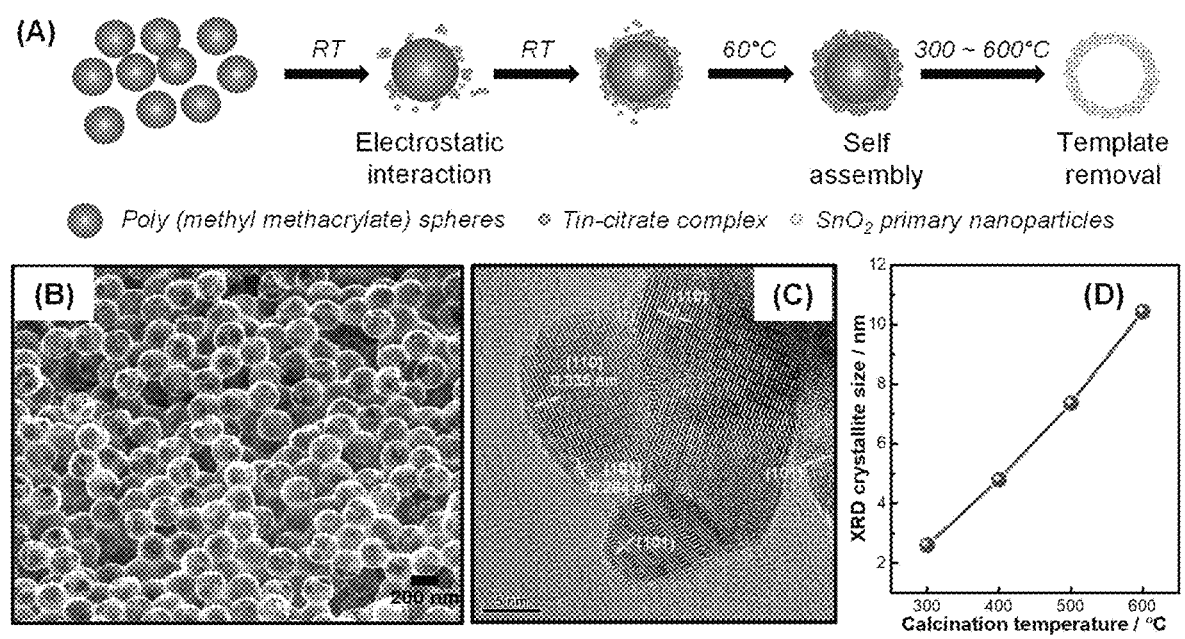
FIG. 1. (A) Scheme illustrating the synthesis of 3D hollow $SnO_2$ nanospheres by a combined sol-gel and templating method. (B) Representative FE-SEM and (C) HR-TEM images of $SnO_2$ spheres calcined at 500° C. (D) XRD crystallite size as a function of calcination temperature.

3D $SnO_2$ nanospheres were prepared by a combined sol-gel and templating approach (FIG. 1A). Negatively charged tin (II) citrate complex was absorbed on the surface of positively-charged poly(methyl methacrylate) (PMMA) spheres (diameter of ca. 220 nm) through electrostatic interaction. The system underwent hydrolysis, condensation, nucleation, and self-assembly to create tin-containing coating layers on the surface of the PMMA spheres. Subsequent calcination in air between 300 to 600° C. converted these coating layers into $SnO_2$ nanocrystals and removed the PMMA template to produce hollow $SnO_2$ nanospheres (FIG. 1B and FIG. 4-6). A representative scanning electron microscope (SEM) image in FIG. 1B shows a $SnO_2$ nanosphere sample calcined at 500° C. HR-TEM micrographs in FIG. 1C and FIG. 6 indicate the nanosphere walls were constructed from small, interconnected nanocrystals. The lattice fringes of 0.335 and 0.264 nm in FIG. 1C correspond to (110) and (101) planes of polycrystalline rutile $SnO_2$.

Figure 4:
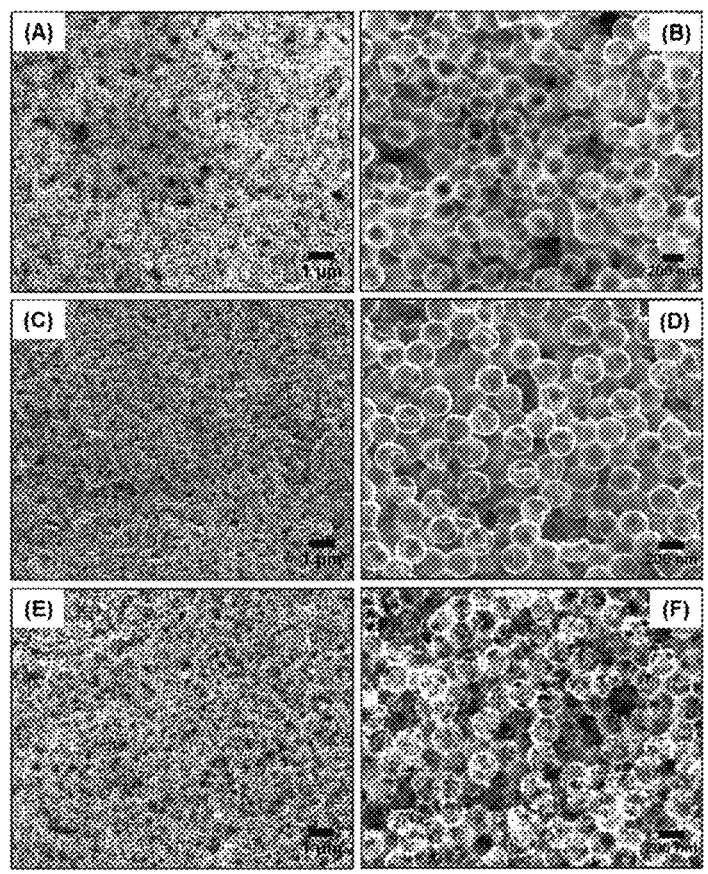
FIG. 4. FE-SEM images of $SnO_2$ nanospheres calcined at (A, B) 300° C., (C, D) 400° C. and (E, F) 600° C. Higher thermal annealing temperatures resulted in broken spherical shells.
Figure 5:
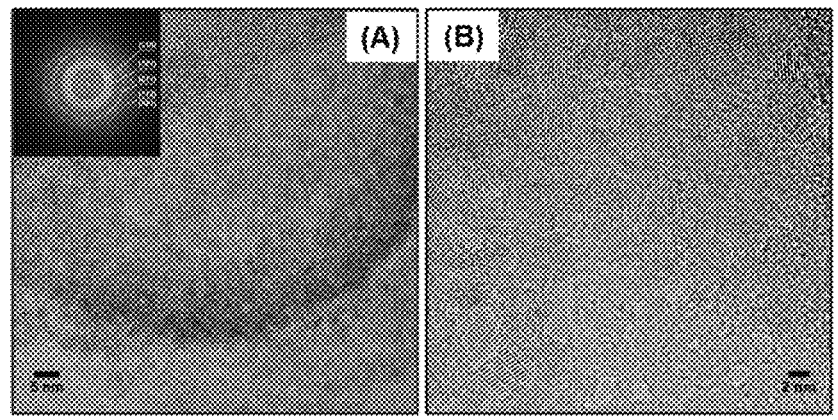
FIG. 5. HR-TEM images of $SnO_2$ nanospheres calcined at 300° C., revealing the spherical shells were ca. 5 nm-thick and composed of 2-3.5 nm $SnO_2$ nanocrystallites. Inset of (A) is the corresponding FFT diffraction pattern showing polycrystalline tetragonal rutile $SnO_2$.
Figure 6:
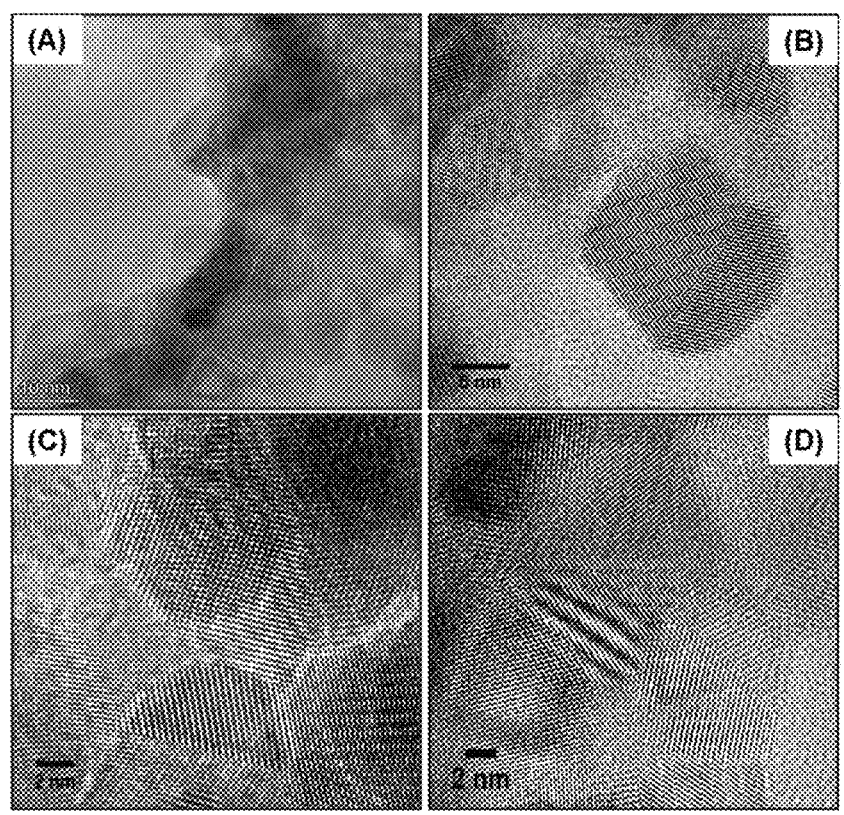
FIG. 6. HR-TEM images of $SnO_2$ nanospheres annealed at 500° C., indicating thicker wall of 25-30 nm containing interconnected 6-9 nm $SnO_2$ nanocrystals with distinct grain boundaries. The TEM-determined nanocrystal diameter of 6-9 nm is consistent with the average 7 nm crystallite size determined from X-Ray diffraction.
Figure 7:
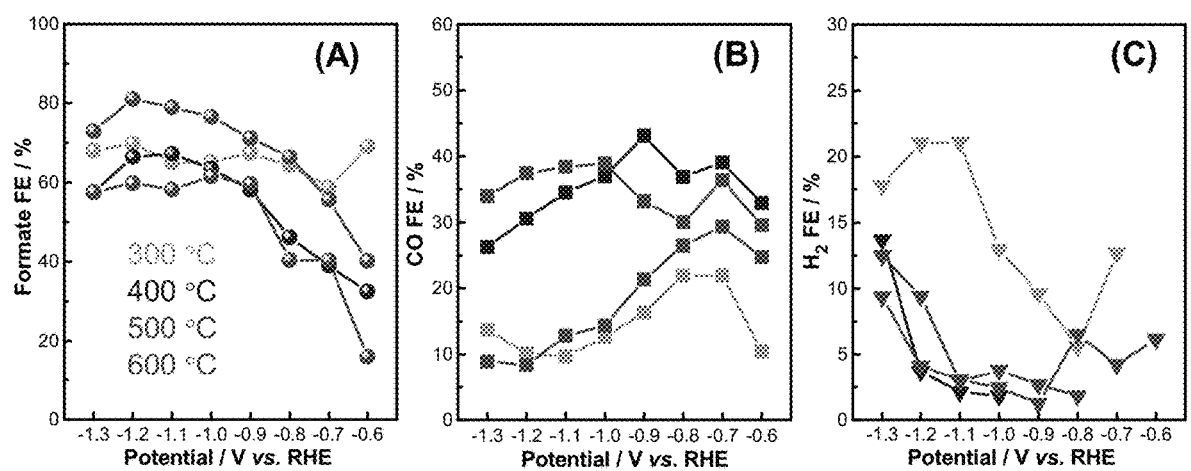
FIG. 7. Comparison of Faradaic efficiency for (A) formate, (B) CO, and (C) $H_2$ vs. potentials for $SnO_2$ nanospheres calcined from 300° C. to 600° C.
Figure 8:
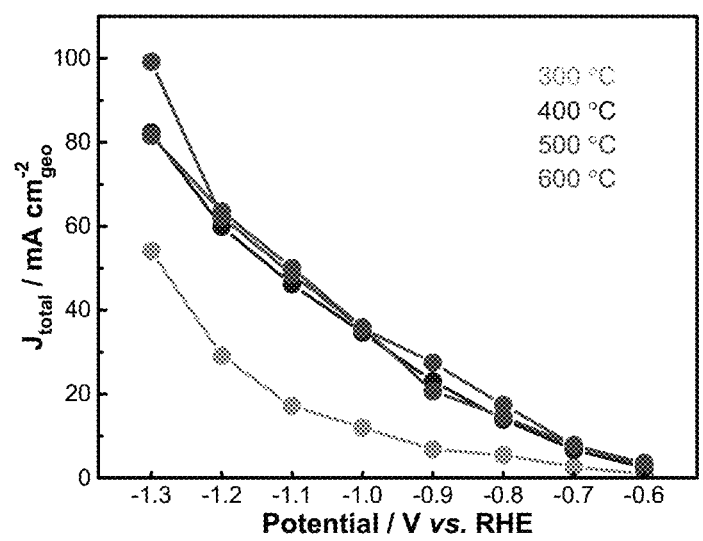
FIG. 8. Total geometric current densities for 3D $SnO_2$ nanosphere series. The bottom trace is from the nanospheres calcined at 300° C.
Figure 9:
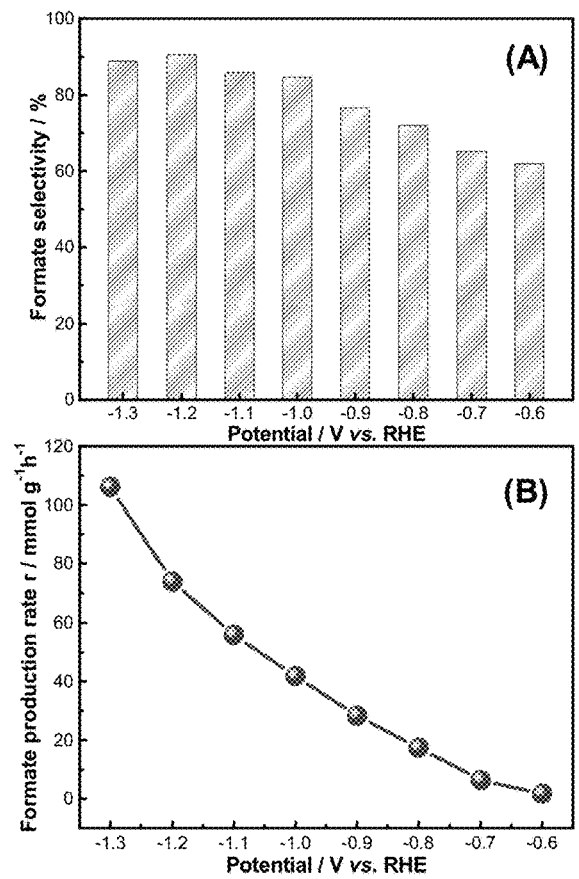
FIG. 9. (A) Formate selectivity (referring to total $CO_2RR$ products) and (B) production rate of formate for $SnO_2$ nanospheres calcined at 500° C.

The PMMA template fixed the nanosphere diameter at 205-210 nm for all calcination temperatures, and XRD and EXAFS confirmed a consistent $SnO_2$ oxidation state and tetragonal rutile structure. Higher calcination temperatures produced sharper, more intense XRD peaks that indicate increased crystallinity and larger mean crystallite size, and FIG. 1D (circles) demonstrates that the $SnO_2$ crystallite size scaled with calcination temperature. These characterizations reveal that both the size and crystallinity of the constituent $SnO_2$ nanocrystals were well-controlled with post-treatment calcination temperature, but we found calcining at 600° C. produced nanosphere structures with severely fractured walls (FIG. 4).

Particle size of primary nanoparticles can be measured by electron microscopy techniques. Since the inventive particles are spherical, all diameters are assumed to be the same, but in the general case, the size is the minimum diameter through the center.

Electrochemical reduction of $CO_2$ was conducted at room temperature in an aqueous electrolyte of 0.1M $KHCO_3$. Typical experiments involved holding an electrochemical potential for a set amount of time in a gas-tight reactor cell. After a pre-determined amount of time the gaseous reaction products were measured with gas chromatography and liquid formate production was measured with ion chromatography.

Figure 2:
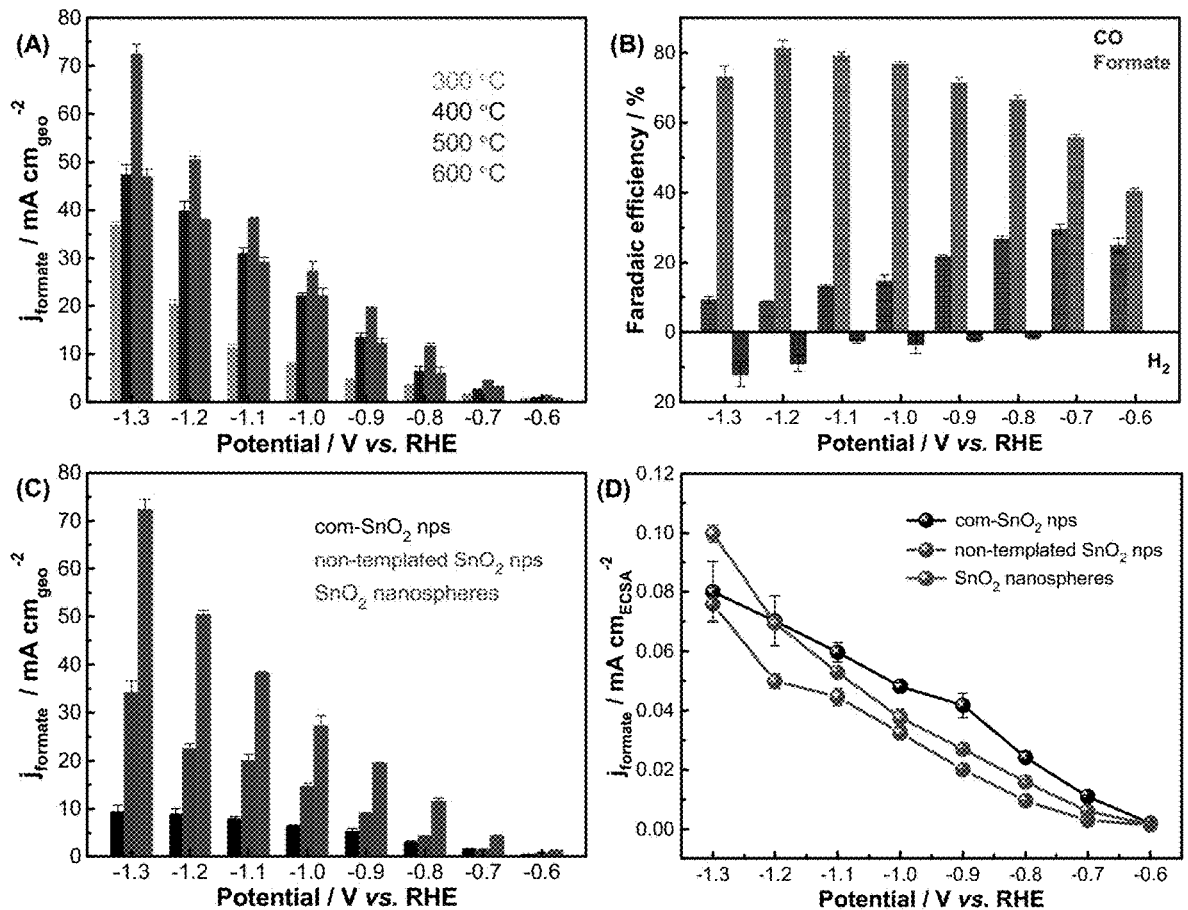
FIG. 2. (A) Formate partial current density vs. cathodic potential of hollow $SnO_2$ nanospheres calcined at different temperatures. (B) Representative Faradaic efficiency for formate, CO, and $H_2$ for $SnO_2$ nanospheres calcined at 500° C. (C) Geometric and (D) ECSA-normalized formate current densities for commercial-$SnO_2$ nps, non-templated $SnO_2$ nps (bottom trace), and the inventive $SnO_2$ nanospheres calcined at 500° C.

A catalytic figure of merit is defined as the partial current density for formate production ($j_{formate}$/mA cm$^{-2}$). This value describes the amount of electrochemical current per geometric electrode area associated with formate production (FIG. 2). In the tested example, formate was produced at rates (partial current densities) approximately six times higher than commercially-available materials. Our formate production rates are also approximately two times higher than the best reported materials in scientific literature. Initial stability testing over several hours shows extremely stable performance and consistent product formation rates. Importantly, no other liquid products were formed. The only other byproducts were gaseous CO and $H_2$ (syngas), which could be easily removed from the reactor and for other industrial applications (methanol synthesis, etc.).

EXAMPLES

Synthesis of Poly (Methyl Methacrylate) (PMMA) Latex

All chemicals were purchased from Sigma-Aldrich and used as received without further purification. PMMA latex was prepared by surfactant-free emulsion polymerization using a cationic free radical initiator. 875 mL of deionized water (DIW) and 100 g of methyl methacrylate ($CH_2$=C($CH_3$)$COOCH_3$) were mixed at room temperature under a nitrogen flow for 30 min and then maintained at 70° C. Subsequently, a solution containing 0.15 g of 2,2'-azobis (2-methylpropionamidine) dihydrochloride ([=NC($CH_3$)$_2$C(=NH)NH$_2$]$_2$·2HCl) and 25 mL of DIW was quickly added under vigorous stirring to form a milky white suspension. The suspension was then stirred at 70° C. for 6 h to complete the polymerization. After cooling down to room temperature for 1 h, the concentration of obtained PMMA latex (size of ca. 220 nm) was 10 wt %. The latex was diluted with DIW to achieve 0.5 wt % for further use.

Synthesis of Hierarchical Hollow $SnO_2$ Spheres

All chemicals were purchased from Sigma-Aldrich and used as received without further purification. Hierarchical hollow $SnO_2$ spheres were synthesized by a combined sol-gel and templating method. Poly (methyl methacrylate) (PMMA) spherical template (diameters of ca. 210 nm) was prepared by surfactant-free emulsion polymerization using a cationic free radical initiator. In a typical procedure, 226 mg of tin (II) chloride dihydrate ($SnCl_2$·$2H_2O$) were dissolved in 5 mL of ethanol ($C_2H_5OH$, 200 proof) and 38 mg of anhydrous citric acid ($C_6H_8O_7$) were separately mixed in 5 mL of ethanol. Citric solution was then added into tin precursor and sonicated for 15 min. 1.5 mL of tin-citric solute ion was dropwise added into 30 mL of aqueous PMMA latex template (0.5 wt %) under vigorous stirring at room temperature. After 30 min, the mixture was evaporated overnight in the oven at 60° C. to obtain the as-synthesized powders. Same stock tin-citric solution was used to make multiple batches of as-synthesized materials which were subsequently annealed in static air at 300, 400, 500 and 600° C. for 3 h with ramping rate of 1° C. min$^{-1}$. The obtained powder was denoted as "$SnO_2$ nanospheres".

Non-hierarchical $SnO_2$ nanoparticles were prepared using similar recipes, except using 30 ml of deionized water in lieu of PMMA dispersion. After evaporation at 60° C., the products were subsequently calcined in air at 500° C. with ramping rate of 1° C. min$^{-1}$ for 3 h and named "non-templated $SnO_2$ nps". Commercial $SnO_2$ nanopowder with <100 nm average particle size (Sigma, product number 549657) was also used as reference material and denoted as "com-$SnO_2$ nps".

Electrochemical $CO_2$ Reduction Measurement

Electrochemical experiments were performed in a gas-tight, two-compartment H-cell separated by a Nafion 117 proton exchange membrane. Each compartment was filled with 60 mL of aqueous 0.1 M $KHCO_3$ electrolyte (99.99%, Sigma-Aldrich) and contained 90 mL headspace. The ultra-pure deionized water with 18.3 MΩ cm$^1$ resistivity (Barnstead EASYpure LF) was used in all electrochemical experiments. The catholyte was continuously bubbled with $CO_2$ (99.999%, Butler gas) at a flow rate of 20 mL min$^{-1}$ (pH ~6.8) under vigorous stirring during the experiments. The counter and reference electrodes were Pt mesh and Ag/AgCl (saturated NaCl, BASi®), respectively. The catalyst ink was composed of 2.8 mg of the powder catalysts, 0.32 mg Vulcan VC-X72 carbon black, and 40 μL of Nafion® 117 solution binder (Sigma-Aldrich, 5%) in 400 μL of methanol. Working electrodes were fabricated by drop-casting the ink onto PTFE-coated carbon paper (Toray paper 060, Alfa Aesar) and $N_2$-dried. The mass loadings were kept at 9.5±0.6 mg$_{ink}$ cm$_{geo}^{-2}$ and 5.4±0.3 mg$_{SnO2}$ cm$_{geo}^{-2}$. Cyclic voltammetry (CV) was obtained in $CO_2$-saturated $KHCO_3$ in the potential window of +1 V and −1.3 V vs. RHE with scan rate of 20 mV s$^{-1}$. All potentials were referenced against the reversible hydrogen electrode (RHE) (unless otherwise specified), typical uncompensated resistances were 40-50Ω, and the uncompensated ohmic loss ($R_u$) was automatically corrected at 85% (iR-correction) using the BioLogic instrument software in all electrochemical experiments.

$CO_2$ electroreduction tests were performed at room temperature using a SP-300 potentiostat (BioLogic Science Instrument). The fresh catholyte was saturated with $CO_2$ by continuously purging with $CO_2$ (20 mL min) under vigorous stirring during the experiments. Short-term chronoamperometric experiments were conducted for 20 min at each applied potential between −0.6 V and −1.3 V vs. RHE and the products were collected every 20 min. Long-term chronoamperometric experiments were conducted over several days at −1.2 V vs. RHE. The testing was run for 5 hours per day and the products were collected every hour. After each cycle, the electrodes were discarded from electrolyte and naturally stored in polystyrene petri dish for next cycle. Fresh aqueous $KHCO_3$ catholyte was used for each cycle. The total and partial current densities were normalized to the exposed geometric area (unless otherwise specified). Each data point is an average of at least three independent experiments on different fresh electrodes. The evolved gas products were collected in a Tedlar gas-tight bag (Supelco) and then quantified by PerkinElmer Clarus 600GC equipped with both FID and TCD detectors, using ShinCarbon ST 80/100 Column and He as a carrier gas. The liquid products collected from the catholytes at intervals of 20 min or 1 h were filtered with PES 0.22 m filter and determined by Dionex ICS-5000+ ion chromatography using ED50 conductometric detector, ASRS suppressor in auto-generation mode, AS11-HC column and KOH eluent with a gradient of 0.4-30 mM in 45 min run.

Materials characterization. Scanning electron microscopy (SEM) imaging was performed on a FEI Quanta 600F microscope operated at 10-20 kV equipped with an energy-dispersive X-ray (EDX) detector. High-resolution transmission electron microscopy (HR-TEM) was carried out on a FEI Titan Themis G2 200 Probe Cs Corrected Scanning Transmission Electron Microscope operated at an accelerating voltage of 200 kV. The powder sample was suspended in ethanol, drop-casted onto a holey carbon supported Cu grid, and naturally dried in air. X-ray powder diffraction (XRD) patterns were collected on a PANalytical X'Pert Pro X-ray diffractometer using CuKα radiation (λ=1.5418 Å) at a scan rate of 0.2° min$^{-1}$. X-ray photoelectron spectroscopy (XPS) was carried out on a PHI 5000 VersaProbe III scanning XPS microprobe (Physical Electronics, ULVAC-PHI Inc) using Al Kα (1486.6 eV) radiation source and a hemispherical analyzer. All the binding energies were internally calibrated to the surface adventitious hydrocarbon feature (C 1s) at 284.6 eV.

Synchrotron X-ray diffraction measurements were conducted at beamline 17-BM-B (λ=0.24121 Å) of the Advanced Photon Source at Argonne National Laboratory. The post-reaction electrodes under the application of −1.2 V vs. RHE were collected in the H-cell as a function of electrolysis time. Two-dimensional diffraction patterns were collected by a Perkin Elmer amorphous silicon detector, data acquisition was performed with QXRD and the diffraction ring was integrated using GSAS-II freeware package.

Raman spectroscopy was performed on a LabRam HR-Evolution spectrometer (Horiba Scientific) with a 633 nm laser as an excitation source and 100× working distance objective, and in situ measurements were carried out using a custom-made electrochemical cell and a 50× long-working-distance objective. The composition of catalyst ink was identical to the one used in $CO_2RR$ H-cell tests with 5 μL of the catalyst ink drop-casted onto a glassy carbon working electrode. A Pt wire and Ag/AgCl were used as counter and reference electrodes, and iR-correction was applied in all measurements. 5 mL of 0.1 M aqueous $KHCO_3$ electrolyte was continuously purged with $CO_2$ during the measurements and sequential Raman spectra were collected under open circuit and at −1.2 V vs. RHE.

Sn K-edge X-ray absorption spectroscopy (XAS) was collected at the 8-ID (ISS) beamline of the National Synchrotron Light Source II (NSLS-II) at Brookhaven National Laboratory using a Passivated Implanted Planar Silicon detector and Sn foil for energy calibration (29.2 keV). All synthesized $SnO_2$ samples, bulk $SnO_2$ and bulk SnO powders were loaded into Kapton capillary and Sn K-edge data were collected in fluorescence modes and subsequently analyzed using IFEFFIT freeware package.

The XRD patterns of 3D $SnO_2$ nanospheres calcined from 300 to 600° C. were indexed to pure tetragonal $SnO_2$ rutile (JCPDS 41-1445) having the space group $P4_2/mnm$. Increasing calcination temperature produced sharper, more intense, peaks that indicate increased crystallinity and crystallite size up to ~10 nm. In addition, the Sn K-edge EXAFS results in show the presence of first nearest neighbor shell of Sn—O and second Sn—Sn coordination shell for all $SnO_2$ sphere samples. Higher calcination temperature led to more intense amplitude of these features, further indicating increased crystallinity, particle size, and coordination numbers, with less disorder.

The symmetrical Sn $3d_{5/2}$ and Sn $3d_{3/2}$ doublet in core-level XPS corresponds to $Sn^{4+}$ oxidation state in rutile $SnO_2$. The $SnO_2$ nanospheres showed up-shifted Sn 3d peaks compared with bulk $SnO_2$, and lower calcination temperatures (smaller $SnO_2$ nanocrystals) produced larger binding energy (BE) increases. Similar size-dependent BE shifts have also been observed for other small $SnO_2$ nanoparticles,[25] as well as nanoparticulate Au,[26] Pd,[27] and PbS[28] systems. There was no evidence of $Sn^{2+}$ or any tin-related impurity phases using other characterizations, including XRD and Raman results.

XRD results of non-templated $SnO_2$ nanoparticles and commercial nanoparticles demonstrate tetragonal rutile $SnO_2$ crystal structure. Non-templated $SnO_2$ nps had almost identical crystallinity, orientation, crystallite size (~7 nm) and structural defects as 3D hierarchical $SnO_2$ nanospheres prepared at same temperature (500° C.). However, commercial $SnO_2$ nanoparticles possessed 4.4 wt % orthorhombic $SnO_2$ phase (JCPDS 78-1063, space group Pbcn), much larger crystal size (ca. 28 nm). Similarly, Sn K-edge EXAFS spectra also showed the first nearest neighbor shell of Sn—O and second Sn—Sn coordination shell for two nanoparticle samples. The Sn 3d doublets also indicated the presence of $Sn^{4+}$ valence state in both non-hierarchical nanoparticle samples.

$SnO_2$ nanospheres show characteristic Raman bands including $A_{1g}$ (symmetric Sn—O stretching), $B_{2g}$ (asymmetric Sn—O stretching), doubly degenerated $E_g$ modes (space group $D_{4h}$), and broad $E_u$ and $A_{2g}$ scattering peaks, as previously noted. In situ Raman spectroscopy was conducted to determine the change in oxidation state during application of electrochemical potential relevant to $CO_2RR$.

In situ time-dependent Raman spectra of $SnO_2$ nanospheres calcined at 500° C. (on glassy carbon electrode) under $CO_2RR$ at −1.2 V vs. RHE showed that the $A_{1g}$ and smaller $E_g$ and $E_u$ peaks were still visible for the $SnO_2$ nanosphere catalysts deposited on a glassy carbon electrode and held at open circuit in $CO_2$ saturated electrolyte. Time-resolved Raman spectra collected at −1.2V vs. RHE showed the attenuation and then complete disappearance of characteristic Raman bands. This result is consistent with the time-dependent XRD shown in FIG. 3C and provides further evidence for the reduction of $SnO_2$ into metallic Sn during $CO_2RR$. No other peaks associated with reduced tin oxides and/or surface-bound intermediate species were observed in the wide region of 150-850 $cm^{-1}$. Our observation is consistent with operando Raman results for reduced graphene oxide supported $SnO_2$ reported by Dutta et al.[45] Oxide fingerprints completely disappeared at very negative potentials, particularly −1.55 V vs. Ag/AgCl, as the catalyst fully reduced to metallic Sn. The re-emergence of characteristic $SnO_2$ Raman bands when the electrode was held at open circuit after electrolysis indicates re-oxidation of the metallic Sn into oxide species.

Electrochemical $CO_2$ reduction performance in an aqueous H-cell. $CO_2RR$ activity was screened between −0.6 V to −1.3 V vs. RHE in an H-cell containing $CO_2$-saturated 0.1 M $KHCO_3$. All $SnO_2$ electrocatalysts produced formate as a main product, along with smaller amounts of CO and $H_2$ (FIG. 7), but $SnO_2$ spheres calcined at 500° C. exhibited the highest FE and formate partial current density ($j_{formate}$) at all potentials (FIG. 2A and FIG. 7-9). This 500° C. $SnO_2$ nanosphere catalyst contained ~7 nm primary nanocrystals, and FIG. 2B shows that it produced 71-81% formate FE between −0.9 V and −1.3 V vs. RHE and a maximum $j_{formate}$ of 73±2 mA $cm_{geo}^{-2}$, which are among the highest performance metrics reported for Sn-based electrocatalysts in aqueous H-Cells (Table 1). The FEs for C1 products reached >90% in the range from −0.8 V to −1.2 V and the $H_2$ evolution reaction was strongly suppressed. It is worth mentioning that gaseous CO and $H_2$ side-products (syngas) are easily separated from liquid formate for subsequent use in methanol or Fischer-Tropsch synthesis.

The results in FIG. 2A also show an apparent dependence on the size of the constituent $SnO_2$ nanocrystals. It has been reported previously that grain boundaries,[4,12,13,18,35,38,39,40,41] oxygen vacancies,[37,42,43] and particle size[31,35,37,43] of $SnO_2$ can impact $CO_2RR$ activity and selectivity. In this study, we suggest that $SnO_2$ nanospheres annealed at 500° C. likely produced an optimum balance between crystallinity and nanocrystal size that maximized formate selectivity and production rate.

Figure 10:
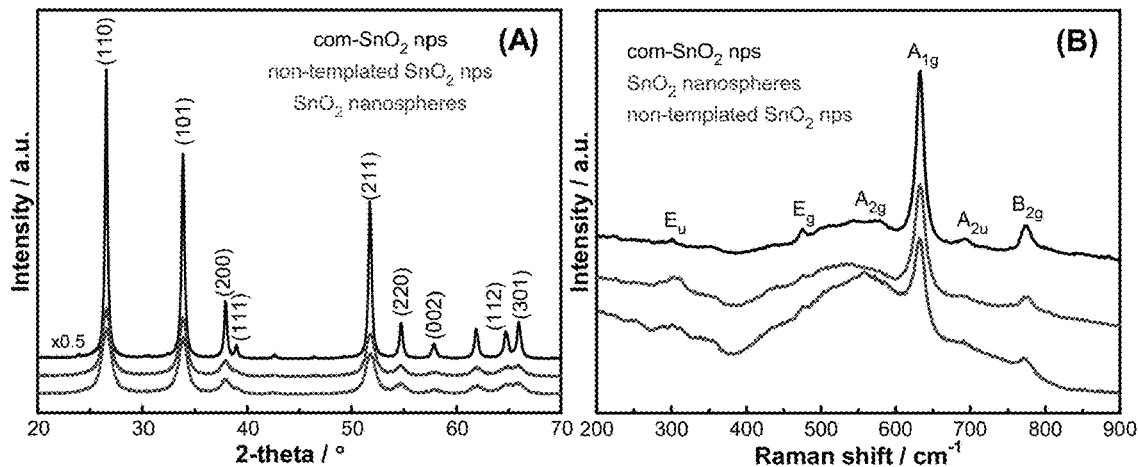
FIG. 10. (A) XRD patterns and (B) Raman spectra of non-templated $SnO_2$ nps and com-$SnO_2$ nps compared with $SnO_2$ nanospheres calcined at 500° C.
Figure 11:
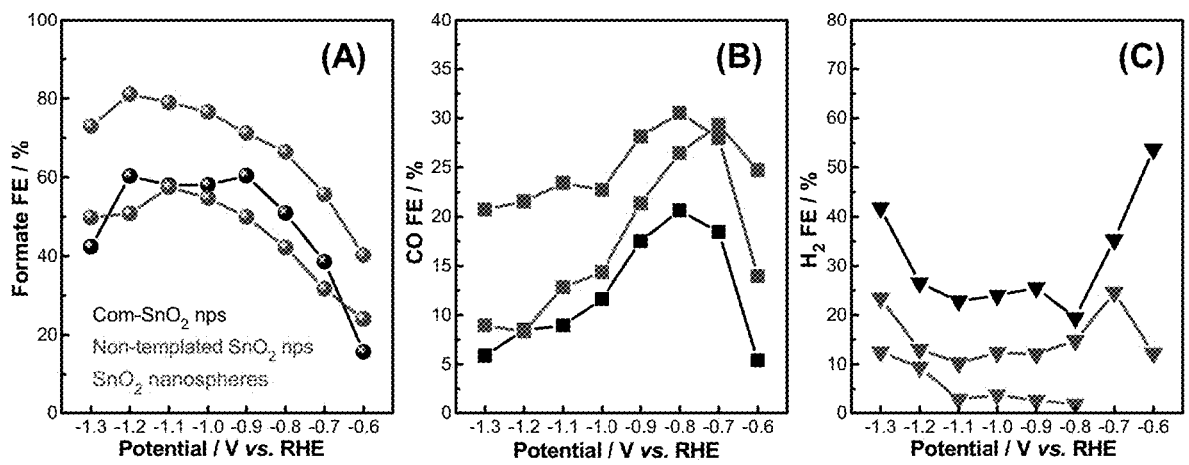
FIG. 11. Comparison of Faradaic efficiency for (A) formate (inventive is top trace), (B) CO, and (C) $H_2$ vs. potentials of the best performing $SnO_2$ nanospheres, non-templated $SnO_2$ nps, and com-$SnO_2$ nps.
Figure 12:
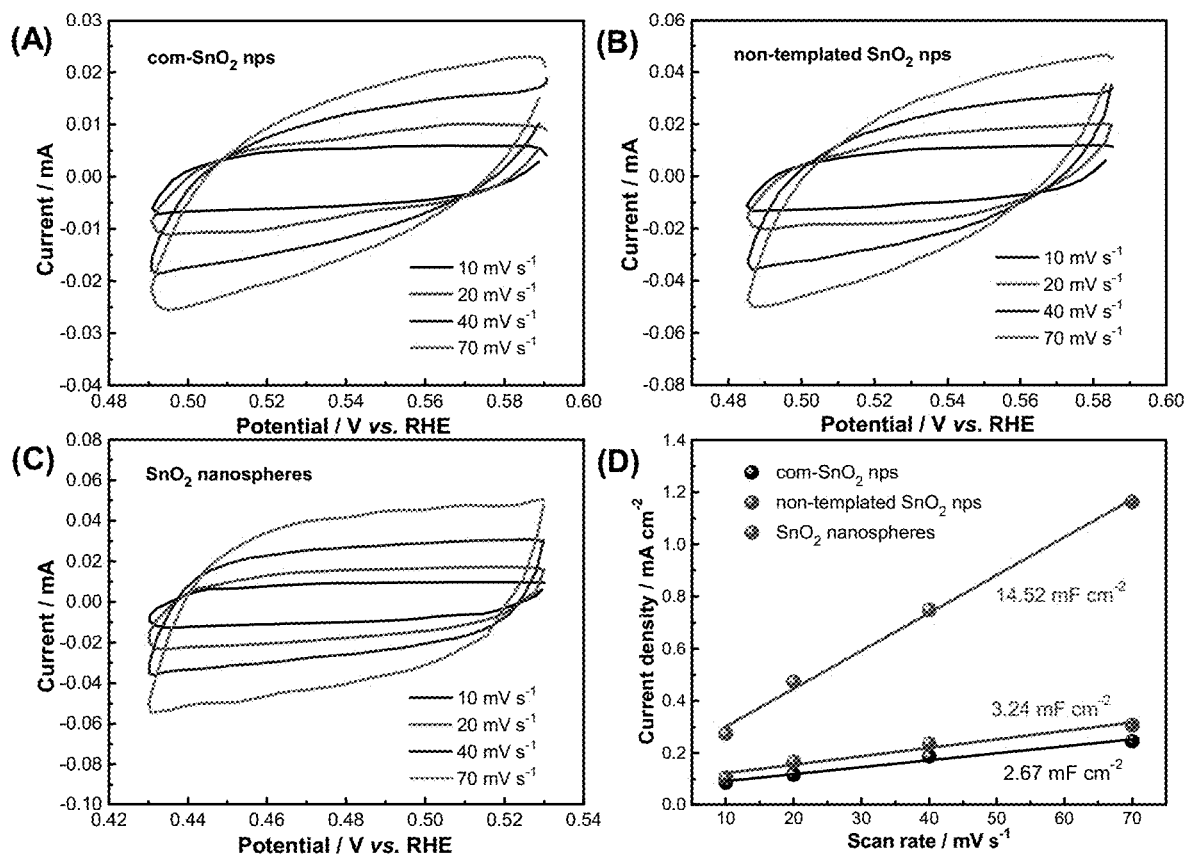
FIG. 12. Double-layer capacitance measurement in $CO_2$-purged 0.1 M $KHCO_3$ electrolyte: (A-C) Cyclic voltammetry profiles measured in the non-Faradaic region with different scan rates. (D) Scan rate dependence of the current density for com-$SnO_2$ nps, non-templated $SnO_2$ nps and the inventive $SnO_2$ nanospheres electrodes.

We also compared the performance of $SnO_2$ nanospheres with similar sized (~7 nm), non-templated $SnO_2$ nps and commercially available $SnO_2$ nps (named com-$SnO_2$ nps) with a heterogeneous particle size distribution between 5-150 nm (FIG. 10). Non-templated $SnO_2$ nps were synthesized with an identical procedure except without the polymer template, and then calcined at 500° C. FIG. 2C and FIG. 11 show the $SnO_2$ nanospheres demonstrated a 2~6-fold improvement in formate partial current density, 20-30% higher formate FE, and reduced $H_2$ evolution compared with the non-templated and commercial $SnO_2$ nps. Capacitance-based electrochemical surface area (ECSA) measurements[9,18,19,38] indicated the $SnO_2$ nanospheres demonstrated approximately 1.5-3 times larger ECSA than the non-templated and commercial $SnO_2$ nps (FIG. 12 and Table 2), but all three samples produced comparable ECSA-normalized formate partial current density (FIG. 2D). This result indicates the total amount of electrochemically active surface area was the dominant influence on geometric formate partial current density. In this regard, controlling the $SnO_2$ nanosphere surface structure improved geometric-based performance over commercially available and non-templated $SnO_2$ nps by maximizing ECSA.

TABLE 2

Double-layer capacitance ($C_{dl}$) and electrochemical surface area (ECSA) for $SnO_2$ nanospheres calcined at 500° C., non-templated $SnO_2$ nps, and com-$SnO_2$ nps. All measurements were carried out in $CO_2$-purged 0.1M $KHCO_3$ and all electrodes had equivalent $SnO_2$ loadings of $5.4 \pm 0.3$ $mg_{SnO2}$ $cm_{geo}^{-2}$ (total ink loading, including $SnO_2$ and carbon black, was $9.5 \pm 0.6$ $mg_{ink}$ $cm_{geo}^{-2}$).

| Sample | $C_{dl}$ [mF cm$^{-2}$] | ECSA [cm$^2$] |
| --- | --- | --- |
| $SnO_2$ nanospheres | 14.52 | 51.3 |
| Non-templated $SnO_2$ nps | 3.24 | 31.8 |
| Com-$SnO_2$ nps | 2.67 | 16.8 |

Figure 3:
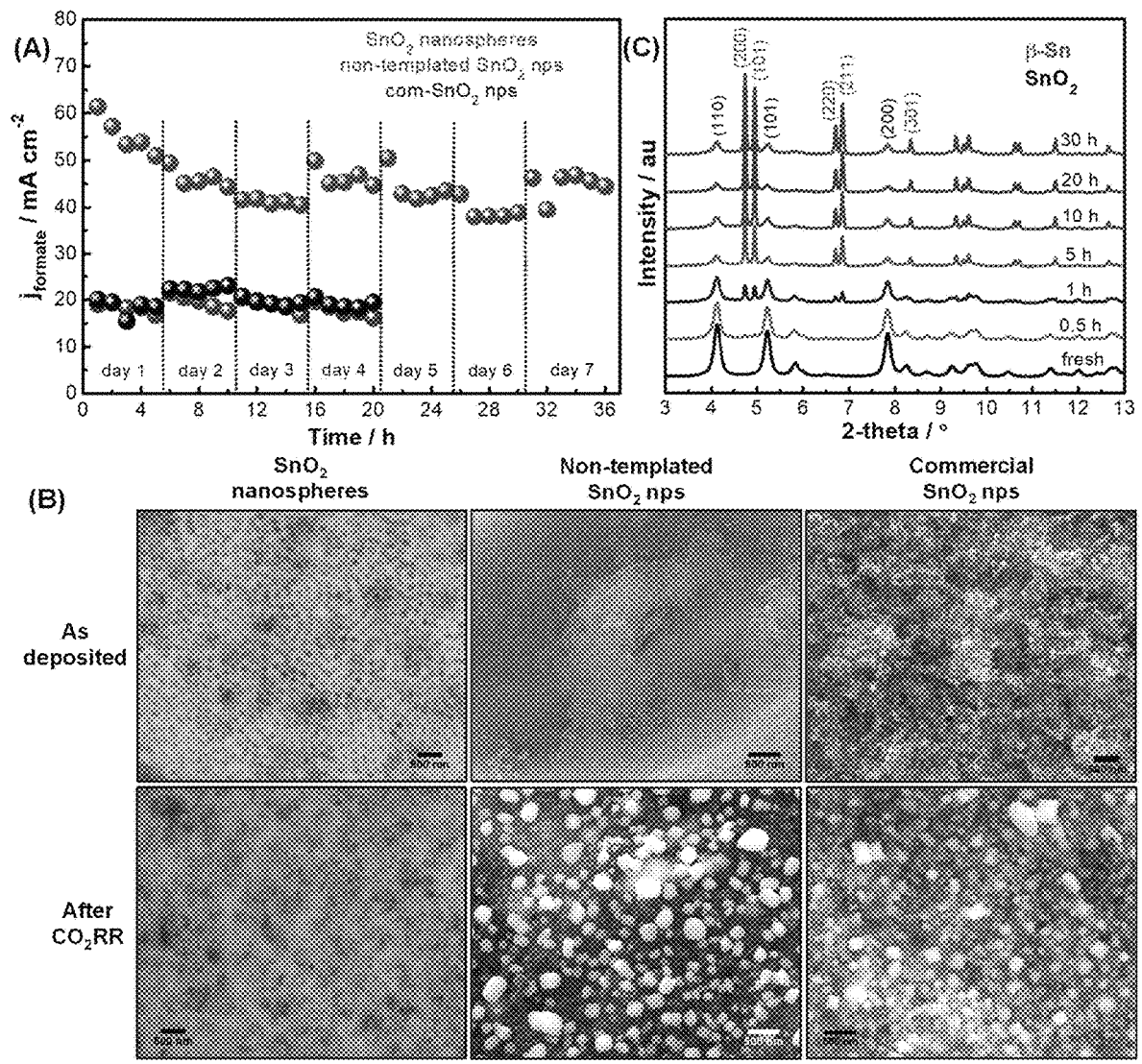
FIG. 3. (A) Long-term durability performance of the inventive $SnO_2$ nanospheres (upper data points), non-templated $SnO_2$ nps, and commercially-available $SnO_2$ nps at −1.2 V vs. RHE during several on/off cycles. (B) FE-SEM images of three electrodes before and after long-term electrolysis. (C) Synchrotron-based XRD patterns of the best-in-class $SnO_2$ nanospheres collected after operating for various time periods at −1.2 V vs. RHE.
Figure 13:
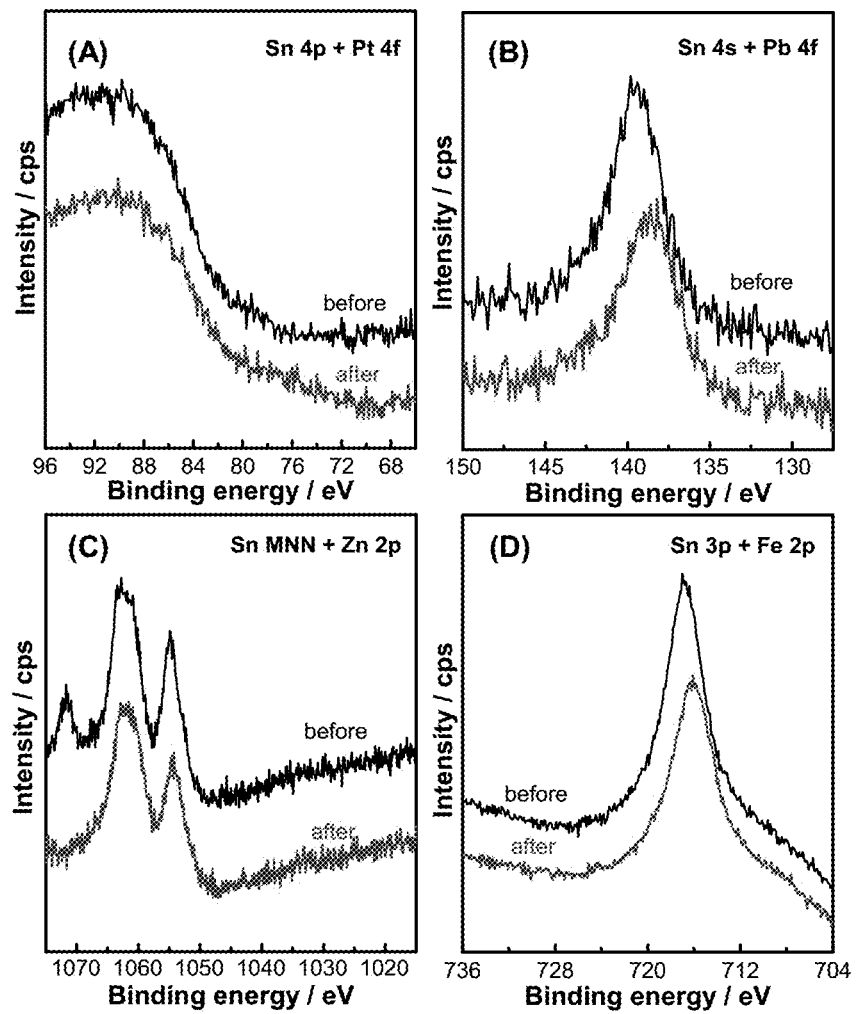
FIG. 13. Core-level (A) Sn 4p+Pt 4f, (B) Sn 4s+Pb 4f, (C) Sn MNN+Zn 2p, and (D) Sn 3p+Fe 2p spectra of $SnO_2$ nanospheres electrode before and after long-term stability run. No distinguishable features of trace Pb, Zn, Fe, or crossover Pt elements indicates these potential trace contaminants were not deposited onto the catalyst surface during the 36-hour electrolysis. A similar lack of contaminants was observed for non-templated and commercially available $SnO_2$ after long-term electrolysis.

The long-term durability of $SnO_2$ nanospheres, non-templated $SnO_2$ nps, and commercial $SnO_2$ nps was evaluated in an H-Cell at −1.2 V vs. RHE with multiple start/stop cycles. As seen in FIG. 3A, formate partial current density for the $SnO_2$ nanosphere catalysts stabilized at an average 45±5 mA $cm_{geo}^{-2}$ over 36 hours of operation with an average 68±8% FE. Non-templated $SnO_2$ nps and com-$SnO_2$ nps produced a smaller ~20 mA $cm_{geo}^{-2}$ and similar ~70% FE during steady state operation. Post-electrolysis SEM imaging in FIG. 3B revealed severe particle agglomeration or coalescence for the non-templated $SnO_2$ nps and commercial $SnO_2$ nps after 20 hours of electrolysis at −1.2V vs. RHE. This behavior has been observed before and agglomeration is a known deactivation mechanism for $SnO_2$ electrocatalyts.[18,44] In contrast, no substantial particle agglomeration was observed for the $SnO_2$ nanospheres, which may stem from the interconnected $SnO_2$ nanocrystals within the nanosphere walls preventing severe particle growth under these conditions. No evidence of trace contaminant deposition on the electrode surface, such as Pt, Fe, Pb, or Zn, was detected on the electrode surface after long-term electrolysis (FIG. 13).

Figure 14:
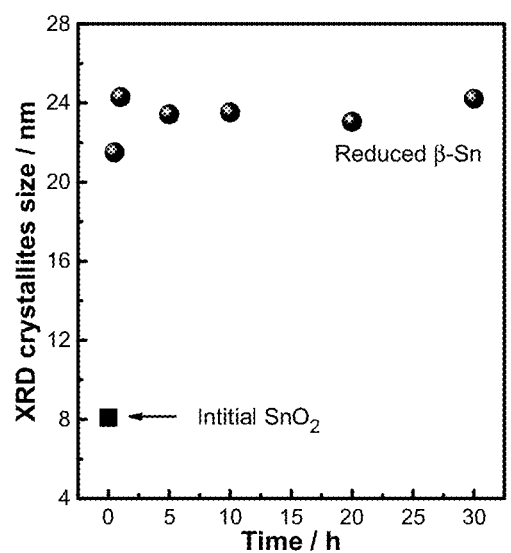
FIG. 14. XRD crystallize size of starting $SnO_2$ and reduced β-Sn as a function of time obtained from time-resolved XRD patterns of $SnO_2$ nanospheres collected at −1.2 V vs. RHE.

Time-dependent, synchrotron-based XRD of $SnO_2$ nanospheres operated at −1.2 V vs. RHE revealed the reduction of $SnO_2$ nanocrystals into metallic Sn through the emergence of body-centered tetragonal β-Sn diffraction peaks (FIG. 3C). These results indicate rapid transformation of $SnO_2$ into metallic Sn and a slight increase in crystallite size to 23-24 nm under steady state operation (FIG. 14). Notably, this crystallite size remained stable over 30 h of operation and the XRD data agrees well with post-reaction SEM imaging that ruled out severe particle growth during long-term electrolysis. We also observed a minor residual oxide phase that likely resulted from re-oxidation upon air exposure. These results strongly support complementary in situ Raman spectroscopy experiments that showed $SnO_2$ was reduced to metallic Sn during $CO_2$RR at −1.2V, which is consistent with previous operando Raman results for other $SnO_2$ $CO_2$RR electrocatalysts.[45]

Calculation of Faradaic Efficiency and Selectivity

The Faradaic efficiency (FE) for product i is defined as the percentage of supplied electrons used to convert $CO_2$ into product i and calculated as follows:

$$FE_i = \frac{z_i * F * n_i}{I * t} = \frac{z_i * F * n_i}{Q}$$

where $z_i$ is the number of electrons involved in the formation of product i (z=2 for formate, CO, and $H_2$); F is the Faraday's constant (96485 C $mol_e^{-1}$); $n_i$ is the number of moles of product i formed (determined by GC and IC); I is the total current; t is electrolysis time; and Q is total charge in Coulombs passed across the electrode.

The formate selectivity is defined as molar ratio of formate compared with the total $CO_2$RR products:

$$S_{formate} = \frac{mol_{formate}}{mol_{formate} + mol_{CO}}$$

$$\text{or: } S_{formate} = \frac{2 * r_{formate}}{2 * r_{formate} + 2 * r_{CO}}$$

where r is production rate for a reduced product, and 2 is the number of electrons involved in the formation of CO and HCOOH.

REFERENCES (1) Qiao, J.; Liu, Y.; Hong, F.; Zhang, J. A Review of Catalysts for the Electroreduction of Carbon Dioxide to Produce Low-Carbon Fuels. *Chem. Soc. Rev.* 2014, 43, 631-675.

(2) Lu, Q.; Rosen, J.; Jiao, F. Nanostructured Metallic Electrocatalysts for Carbon Dioxide Reduction. *ChemCatChem* 2015, 7, 38-47.

(3) Vasileff, A.; Zheng, Y.; Qiao, S. Z. Carbon Solving Carbon's Problems: Recent Progress of Nanostructured Carbon-Based Catalysts for the Electrochemical Reduction of $CO_2$. *Adv. Energy Mater.* 2017, 7, 1700759.

(4) Wang, Y.; Han, P.; Lv, X.; Zhang, L.; Zheng, G. Defect and Interface Engineering for Aqueous Electrocatalytic $CO_2$ Reduction. *Joule* 2018, 2, 2551-2582.

(5) Zhao, S.; Li, S.; Guo, T.; Zhang, S.; Wang, J.; Wu, Y.; Chen, Y. Advances in Sn-Based Catalysts for Electrochemical $CO_2$ Reduction. *Nano-Micro Lett.* 2019, 11, 62.

(6) Han, N.; Ding, P.; He, L.; Li, Y.; Li, Y. Promises of Main Group Metal-Based Nanostructured Materials for $CO_2$ Reduction to Formate. *Adv. Energy Mater.* 2020, 10, 1902338.

(7) Xie, J. F.; Huang, Y. X.; Li, W. W.; Song, X. N.; Xiong, L.; Yu, H. Q. Efficient Electrochemical $CO_2$ Reduction on a Unique *Chrysanthemum*-like Cu Nanoflower Electrode and Direct Observation of Carbon Deposite. *Electrochim. Acta* 2014, 139, 137-144.

(8) Won, D. H.; Choi, C. H.; Chung, J.; Chung, M. W.; Kim, E. H.; Woo, S. I. Rational Design of a Hierarchical Tin Dendrite Electrode for Efficient Electrochemical Reduction of $CO_2$. *ChemSusChem* 2015, 8, 3092-3098.

(9) Li, Y. N.; Qiao, J. L.; Zhang, X.; Lei, T.; Girma, A.; Liu, Y. Y.; Zhang, J. J. Rational Design and Synthesis of $SnO_x$ Electrocatalysts with Coralline Structure for Highly Improved Aqueous $CO_2$ Reduction to Formate. *ChemElectroChem* 2016, 3, 1618-1628.

(10) Fu, Y.; Li, Y.; Zhang, X.; Liu, Y.; Qiao, J.; Zhang, J.; Wilkinson, D. P. Novel Hierarchical $SnO_2$ Microsphere Catalyst Coated on Gas Diffusion Electrode for Enhancing Energy Efficiency of $CO_2$ Reduction to Formate Fuel. *Appl. Energy* 2016, 175, 536-544.

(11) Du, D.; Lan, R.; Humphreys, J.; Sengodan, S.; Xie, K.; Wang, H.; Tao, S. Achieving Both High Selectivity and Current Density for $CO_2$ Reduction to Formate on Nanoporous Tin Foam Electrocatalysts. *ChemistrySelect* 2016, 1, 1711-1715.

(12) Kumar, B.; Atla, V.; Brian, J. P.; Kumari, S.; Nguyen, T. Q.; Sunkara, M.; Spurgeon, J. M. Reduced $SnO_2$ Porous Nanowires with a High Density of Grain Boundaries as Catalysts for Efficient Electrochemical $CO_2$-into-HCOOH Conversion. *Angew. Chem., Int. Ed.* 2017, 56, 3644-3649.

(13) Liang, C.; Kim, B.; Yang, S.; Liu, Y.; Woellner, C. F.; Li, Z.; Vajtai, R.; Yang, W.; Wu, J.; Kenis, P. J. A.; Ajayan, P. M. High Efficiency Electrochemical Reduction of $CO_2$ beyond the Two-Electron Transfer Pathway on Grain Boundary Rich Ultra-Small $SnO_2$ Nanoparticles. *J. Mater. Chem. A* 2018, 6, 10313-10319.

(14) Koh, J. H.; Won, D. H.; Eom, T.; Kim, N. K.; Jung, K. D.; Kim, H.; Hwang, Y. J.; Min, B. K. Facile $CO_2$ Electro-Reduction to Formate via Oxygen Bidentate Intermediate Stabilized by High-Index Planes of Bi Dendrite Catalyst. *ACS Catal.* 2017, 7, 5071-5077.

(15) Nguyen-Phan, T. D.; Wang, C.; Marin, C. M.; Zhou, Y.; Stavitski, E.; Popczun, E. J.; Yu, Y.; Xu, W.; Howard, B. H.; Stuckman, M. Y.; Waluyo, I.; Ohodnicki, Jr., P. R.; Kauffman, D. R. Understanding Three-Dimensionally Interconnected Porous Oxide-Derived Copper Electrocatalyst for Selective Carbon Dioxide Reduction. *J. Mater. Chem. A* 2019, 7, 27576-27584.

(16) Liu, Y.; Fan, M.; Zhang, X.; Zhang, Q.; Guay, D.; Qiao, J. Design and Engineering of Urchin-like Nanostructured $SnO_2$ Catalysts via Controlled Facial Hydrothermal Synthesis for Efficient Electro-Reduction of $CO_2$. *Electrochim. Acta* 2017, 248, 123-132.

(17) Xia, Z.; Freeman, M.; Zhang, D.; Yang, B.; Lei, L.; Li, Z.; Hou, Y. Highly Selective Electrochemical Conversion of $CO_2$ to HCOOH on Dendritic Indium Foams. *ChemElectroChem* 2018, 5, 253-259.

(18) Bejtka, K.; Zeng, J.; Sacco, A.; Castellino, M.; Hernendez, S.; Farkhondehfal, M. A.; Savino, U.; Ansaloni, S.; Pirri, C. F.; Chiodoni, A. Chainlike Mesoporous $SnO_2$ as a Well-Performing Catalyst for Electrochemical $CO_2$ Reduction. *ACS Appl. Energy Mater.* 2019, 2, 3081-3091.

(19) Luo, W.; Xie, W.; Li, M.; Zhang, J.; Züttel, A. 3D Hierarchical Porous Indium Catalyst for Highly Efficient Electroreduction of $CO_2$. *J. Mater. Chem. A* 2019, 7, 4505-4515.

(20) Luo, W.; Zhang, J.; Li, M.; Züttel, A. Boosting CO Production in Electrocatalytic $CO_2$ Reduction on Highly Porous Zn Catalysts. *ACS Catal.* 2019, 9, 3783-3791.

(21) Chen, X.; Liu, Y.; Wu, J. Sustainable Production of Formic Acid from Biomass and Carbon Dioxide. *Mol. Catal.* 2020, 483, 110716.

(22) Olah, G. A.; Goeppert, A.; Prakash, G. K. S. 2006 Beyond Oil and Gas: The Methanol Economy, Third, Updated and Enlarged Edition; Wiley-VCH: Weinheim, Germany. 2018.

(23) Hellstén, P. P.; Salminen, J. M.; Jorgensen, K. S.; Nystén, T. H. Use of Potassium Formate in Road Winter Deicing Can Reduce Groundwater Deterioration. *Environ. Sci. Technol.* 2005, 39, 5095-5100.

(24) Lissner, H.; Wehrer, M.; Jartun, M.; Totsche, K. U. Degradation of Deicing Chemicals Affects the Natural Redox System in Airfield Soils. *Environ. Sci. Pollut. Res.* 2014, 21, 9036-9053.

(25) Vo, T.; Purohit, K.; Nguyen, C.; Biggs, B.; Mayoral, S.; Haan, J. L. Formate: An Energy Storage and Transport Bridge between Carbon Dioxide and a Formate Fuel Cell in a Single Device. *ChemSusChem* 2015, 8, 3853-3858.

(26) Ha, S.; Larsen, R.; Zhu, Y.; Masel, R. I. Direct Formic Acid Fuel Cells with 600 mA $cm^{-2}$ at 0.4 V and 22° C. *Fuel Cells* 2004, 4, 337-343.

(27) Enthaler, S.; von Langermann, J.; Schmidt, T. Carbon Dioxide and Formic Acid—The Couple for Environmental-Friendly Hydrogen Storage?*Energy Environ. Sci.* 2010, 3, 1207-1217.

(28) Eppinger, J.; Huang, K. W. Formic Acid as a Hydrogen Energy Carrier. *ACS Energy Lett.* 2017, 2, 188-195.

(29) Valentini, F.; Kozell, V.; Petrucci, C.; Marrocchi, A.; Gu, Y.; Gelman, D.; Vaccaro, L. Formic Acid, a Biomass-Derived Source of Energy and Hydrogen for Biomass Upgrading. *Energy Environ. Sci.* 2019, 12, 2646-2664.

(30) Ferrer, J. S. J.; Laborie, S.; Durand, G.; Rakib, M. Formic Acid Regeneration by Electromembrane Processes. *J. Membrane Sci.* 2006, 280, 509-516.

(31) Zhang, S.; Kang, P.; Meyer, T. J. Nanostructured Tin Catalysts for Selective Electrochemical Reduction of Carbon Dioxide to Formate. *J. Am. Chem. Soc.* 2014, 136, 1734-1737.

(32) Chen, Y.; Kanan, M. W. Tin Oxide Dependence of the $CO_2$ Reduction Efficiency on Tin Electrodes and Enhanced Activity for Tin/Tin Oxide Thin-Film Catalysts. *J. Am. Chem. Soc.* 2012, 134, 1986-1989.

(33) Lv, W.; Zhang, R.; Gao, P.; Lei, L. Studies on the Faradaic Efficiency for Electrochemical Reduction of Carbon Dioxide to Formate on Tin Electrode. *J. Power Sources* 2014, 252, 276-281.

(34) Zhao, C.; Wang, J.; Goodenough, J. B. Comparison of Electrocatalytic Reduction of $CO_2$ to HCOOH with Different Tin Oxides on Carbon Nanotubes. *Electrochem. Commun.* 2016, 65, 9-13.

(35) Fan, L.; Xia, Z.; Xu, M.; Lu, Y.; Li, Z. 1D $SnO_2$ with Wire-in-Tube Architectures for Highly Selective Electrochemical reduction of $CO_2$ to $C_1$ products. *Adv. Funct. Mater.* 2018, 28, 1706289.

(36) Yadav, V. S. K.; Noh, Y.; Han, H.; Kim, W. B. Synthesis of Sn Catalysts by Solar Electro-Deposition Method for Electrochemical $CO_2$ Reduction Reaction to HCOOH. *Catal. Today* 2018, 303, 276-281.

(37) Daiyan, R.; Lovell, E. C.; Bedford, N. M.; Saputera, W. H.; Wu, K. H.; Lim, S.; Horlyck, J.; Ng, Y. H.; Lu, X.; Amal, R. Modulating Activity through Defect Engineering of Tin Oxides for Electrochemical $CO_2$ Reduction. *Adv. Sci.* 2019, 6, 1900678.

(38) Liu, S.; Xiao, J.; Lu, X. F.; Wang, J.; Wang, X.; Lou, X. W. (D.). Efficient Electrochemical Reduction of $CO_2$ to HCOOH over Sub-2 nm $SnO_2$ Quantum Wires with Exposed Grain Boundaries. *Angew. Chem. Int. Ed.* 2019, 58, 8499-8503.

(39) Feng, X.; Jiang, K.; Fan, S.; Kanan, M. W. Grain-Boundary-Dependent $CO_2$ Electroreduction Activity. *J. Am. Chem. Soc.* 2015, 137, 4606-4609.

(40) Kim, K. S.; Kim, W. J.; Lim, H. K.; Lee, E. K.; Kim, H. Tuned Chemical Bonding Ability of Au at Grain Boundaries for Enhanced Electrochemical $CO_2$ Reduction. *ACS Catal.* 2016, 6, 4443-4448.

(41) Feng, X.; Jiang, K.; Fan, S.; Kanan, M. W. A Direct Grain-Boundary-Activity Correlation for CO Electroreduction on Cu Nanoparticles. *ACS Cent. Sci.* 2016, 2, 169-174.

(42) Li, L.; Zhao, Z. J.; Hu, C.; Yang, P.; Yuan, X.; Wang, Y.; Zhang, L.; Moskaleva, L.; Gong, J. Tuning Oxygen Vacancies of Oxides to Promote Electrocatalytic Reduction of Carbon Dioxide. *ACS Energy Lett.* 2020, 5, 552-558.

(43) Pavithra, K.; Kumar, S. M. S. Embedding Oxygen Vacancies at $SnO_2$—CNT Surfaces via a Microwave Polyol Strategy Towards Effective Electrocatalytic Reduction of Carbon-Dioxide to Formate. *Catal. Sci. Technol.* 2020, 10, 1311-1322.

(44) Xiang, H.; Miller, H. A.; Bellini, M.; Christensen, H.; Scott, K.; Rasul, S.; Yu, E. H. Production of Formate by $CO_2$ Electrochemical Reduction and its Application in Energy Storage. *Sustain. Energy Fuels* 2020, 4, 277-284.

(45) Dutta, A.; Kuzume, A.; Kaliginedi, V.; Rahaman, M.; Sinev, I.; Ahmadi, M.; Cuenya, B. R.; Vesztergom, S.; Broekmann, P. Probing the Chemical State of Tin Oxide NP Catalysts during $CO_2$ Electroreduction: A Complementary Operando Approach. *Nano Energy* 2018, 53, 828-840.

What is claimed:

1. A $SnO_2$ powder, comprising at least 90 mass % hollow spheres in the (diameter) size range of 175 to 225 nm; and wherein the spheres are comprised of $SnO_2$ particles.

2. The $SnO_2$ powder of claim 1 wherein at least 90 mass % hollow spheres are in the (diameter) size range of 180 to 220 nm or 190 to 210 nm.

3. The $SnO_2$ powder of claim 1, wherein at least 90 mass % of the spheres have diameters within a ±7 nm size range, a ±5 nm size range, or a ±3 nm size range.

4. The $SnO_2$ powder of claim 1, wherein the hollow spheres have a wall thickness in the range of 20 to 35 nm or 25 to 30 nm.

5. The $SnO_2$ powder of claim 1, comprising a $j_{total}/mA\ cm^{-2}_{geo}$ of at least 50 at 1.2 V vs. RHE.

6. A $SnO_2$ powder, comprising hollow spheres having a diameter of 100 nm or greater, wherein the spheres are comprised of $SnO_2$ particles, and wherein at least 90 mass % of the spheres have diameters within a ±10 nm range.

7. The $SnO_2$ powder of claim 6, wherein at least 90 mass % of the spheres have diameters within a size range of 200 to 220 nm.

8. The $SnO_2$ powder of claim 6, wherein the hollow spheres are comprised of nanocrystals having a mass average diameter in the range of 5 to 15 nm, 5-10 nm, or 6 to 9 nm.

9. The $SnO_2$ powder of claim 1, wherein, as measured by XRD, the hollow spheres are comprised of nanocrystals having an average crystallite size in the range of 5 to 10 nm, 6 to 9 nm, or 6 to 8 nm.

10. The $SnO_2$ powder of claim 6, comprising a durability of maintaining a $j_{formate}$ ($mA\ cm^{-2}$) of at least 35 at 1.2 V vs. RHE for at least two days without regeneration.

11. The $SnO_2$ powder of claim 6, comprising an ESCA of at least 35 $cm^{-2}$.

* * * * *